United States Patent
Ricks et al.

(10) Patent No.: US 11,650,119 B2
(45) Date of Patent: *May 16, 2023

(54) PRESSURE SENSOR WITH MULTIPLE PRESSURE SENSING ELEMENTS

(71) Applicant: Honeywell International Inc., Charlotte, NC (US)

(72) Inventors: Lamar Floyd Ricks, Westerville, OH (US); Ian Bentley, New Ipswich, NH (US); Jim Cook, Columbus, OH (US); Josh M. Fribley, Columbus, OH (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/448,159

(22) Filed: Sep. 20, 2021

(65) Prior Publication Data

US 2022/0003623 A1 Jan. 6, 2022

Related U.S. Application Data

(63) Continuation of application No. 16/376,703, filed on Apr. 5, 2019, now Pat. No. 11,156,521.

(51) Int. Cl.
*G01L 15/00* (2006.01)
*G01L 19/14* (2006.01)

(52) U.S. Cl.
CPC ............ *G01L 15/00* (2013.01); *G01L 19/147* (2013.01)

(58) Field of Classification Search
None
See application file for complete search history.

(56) References Cited

U.S. PATENT DOCUMENTS

| 8,770,034 B2* | 7/2014 | Bentley | G01L 9/0054 |
| | | | 73/715 |
| 11,156,521 B2* | 10/2021 | Ricks | G01L 19/143 |
| 2007/0068268 A1 | 3/2007 | Dell et al. | |
| 2007/0151366 A1* | 7/2007 | McDonald | A61M 5/16886 |
| | | | 73/861.63 |
| 2007/0197922 A1* | 8/2007 | Bradley | G01L 19/0023 |
| | | | 600/488 |
| 2010/0043530 A1* | 2/2010 | Elian | B81B 7/0048 |
| | | | 73/31.06 |

(Continued)

FOREIGN PATENT DOCUMENTS

| CN | 102401715 A | 4/2012 |
| CN | 106370342 A | 2/2017 |

(Continued)

OTHER PUBLICATIONS

European search opinion issued in EP Application No. 20167852.1, dated Nov. 24, 2020, 7 pages.

(Continued)

*Primary Examiner* — Brandi N Hopkins
*Assistant Examiner* — Nigel H Plumb
(74) *Attorney, Agent, or Firm* — Alston & Bird LLP

(57) ABSTRACT

A pressure sensor includes a substrate, a first pressure sensing element, a second pressure sensing element, and sensor conditioning circuitry disposed on a first surface of the substrate. The sensor conditioning circuitry is electronically coupled to the first pressure sensing element and the second pressure sensing element, thus multiple pressure sensing elements being disposed on a single substrate can reduce material cost and improve the performance of the pressure sensor.

20 Claims, 10 Drawing Sheets

(56) References Cited

U.S. PATENT DOCUMENTS

| | | | | |
|---|---|---|---|---|
| 2012/0240686 A1* | 9/2012 | Blomberg | ............ | G01L 19/003 |
| | | | | 73/756 |
| 2013/0098160 A1* | 4/2013 | Rozgo | ................... | G01L 19/147 |
| | | | | 29/428 |
| 2014/0083209 A1* | 3/2014 | Wade | ........................ | G01L 1/26 |
| | | | | 73/862.381 |

FOREIGN PATENT DOCUMENTS

| | | |
|---|---|---|
| EP | 1767916 A2 | 3/2007 |
| EP | 2568270 A1 | 3/2013 |

OTHER PUBLICATIONS

European search report issued in EP Application No. 20167852.1, dated Nov. 24, 2020, 4 pages.

Non-Final Rejection dated Mar. 11, 2021 for U.S. Appl. No. 16/376,703.

Notice of Allowance and Fees Due (PTOL-85) dated Jun. 21, 2021 for U.S. Appl. No. 16/376,703.

Notice of Allowance received for U.S. Appl. No. 16/376,703, dated Aug. 16, 2021, 2 pages.

Notice of Allowance received for U.S. Appl. No. 16/376,703, dated Jun. 29, 2021, 4 pages.

Notice of Publication and Entry into Examination Stage issued in Chinese Application No. 202010264741.6 dated Oct. 26, 2020, 2 pages.

Office Action issued in Chinese Application No. 202010264741.6 dated Jun. 29, 2021, 9 pages.

Partial European Search Report for Patent Application No. 20167852.1 dated Aug. 24, 2020, 15 pages.

CN Notice of Allowance dated Feb. 18, 2022 for CN Application No. 202010264741.

Office Action received for European Application No. 20167852.1, dated Oct. 18, 2022, 7 pages.

* cited by examiner

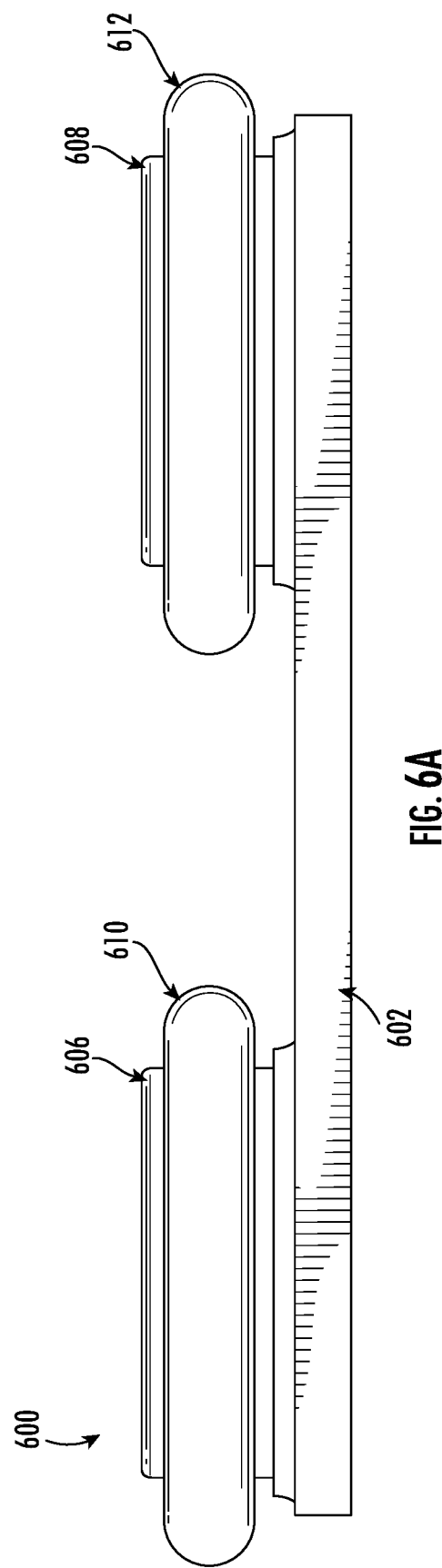

PRESSURE SENSOR WITH MULTIPLE PRESSURE SENSING ELEMENTS

CROSS-REFERENCE TO RELATED APPLICATIONS

This application is a continuation of U.S. patent application Ser. No. 16/376,703, filed Apr. 5, 2019, which is incorporated herein by reference in its entirety.

FIELD OF THE INVENTION

The present disclosure relates generally to apparatuses, systems, and methods for providing a pressure sensor, and more particularly, to apparatuses, systems, and methods for providing one sensor conditioning circuitry (such as an application-specific integrated circuit (ASIC)) that is electronically coupled with multiple pressure sensing elements (such as micro-electro-mechanical system (MEMS) pressure sensing dies) that are disposed on one common substrate.

BACKGROUND

Many products and devices (such as, for example, consumer products and medical devices) require the inclusion of sensors, such as pressure sensors. Such products and devices are typically manufactured in high volume, and therefore are cost sensitive and may require the sensor to implement a lean architecture. Applicant has identified various deficiencies and problems associated with existing methods, apparatus, and systems related to sensors. For example, in existing sensors, integrated circuits account for a significant portion of the sensor's cost. Accordingly, there is an on-going need in the art for sensor architectures that reduce the number of integrated circuits necessary to achieve suitable functionality. Additionally, there is an on-going need in the art for sensors that having lean architecture characteristics to better facilitate high volume manufacturing.

BRIEF SUMMARY

Various embodiments described herein relate to methods, apparatuses, and systems for improving the performance of pressure sensors. In particular, various embodiments are directed to a pressure sensor with multiple pressure sensing elements disposed on a single substrate.

In various embodiments, a pressure sensor is provided. The pressure sensor may comprise a substrate having a first surface and a second surface, a first pressure sensing element disposed on the first surface of the substrate, a second pressure sensing element disposed on the first surface of the substrate, and sensor conditioning circuitry disposed on the first surface of the substrate. The sensor conditioning circuitry is electronically coupled to the first pressure sensing element and the second pressure sensing element. The pressure sensor further comprises a house member disposed on the first surface of the substrate. The housing member and first surface of the substrate define a first cavity housing the first pressure sensing element and a second cavity housing the second pressure sensing element.

In some embodiments, the housing member comprises a first cover portion and a second cover portion. The first cover portion may, for example, define the first cavity, while the second cover portion defines the second cavity. In certain embodiments, the housing member further comprises a notch portion disposed between the first cover portion and the second cover portion. In some embodiments, the sensor conditioning circuitry is disposed within the first cavity along with the first pressure sensing element.

In some embodiments, the first cover portion comprises a first pressure port having a first opening, and the second cover portion comprises a second pressure port having a second opening. In some embodiments, the first pressure port has a first barb, and the second pressure port has a second barb.

In some embodiments, the housing member comprises a first side and a second side. The first pressure port is disposed on the first side, and the second pressure port is disposed on the second side.

In some embodiments, the housing member comprises a first side, and the first pressure port and the second pressure port are disposed on the first side.

In some embodiments, the first cover portion comprises a first pressure port having a first opening and a second pressure port having a second opening. The second cover portion comprises a third pressure port having a third opening and a fourth pressure port having a fourth opening. In some embodiments, the housing member comprises a first side and a second side. The first pressure port is disposed on the first side, and the third pressure port is disposed on the second side. In some embodiments, the housing member comprises a third side, and the second pressure port and the fourth pressure port are disposed on the third side.

In some embodiments, the pressure sensor comprises a signal conditioning application-specific integrated circuit (ASIC) layer disposed on the first surface of the substrate, and the first pressure sensing element is disposed on the signal conditioning ASIC layer. In some embodiments, the signal conditioning ASIC layer comprises at least one trench.

In some embodiments, the pressure sensor comprises an electronic communication element disposed on the first surface of the substrate, and the second pressure sensing element is disposed on the electronic communication element.

In some embodiments, the pressure sensor comprises a buffer layer disposed on the first surface of the substrate, and the first pressure sensing element is disposed on the buffer layer. In some embodiments, the buffer layer comprises at least one trench.

In certain embodiments, the pressure sensor comprises a first tubing port and a second tubing port disposed on the first surface of the substrate. In such embodiments, the first pressure sensing element and the sensor conditioning circuitry may be disposed within the first tubing port, and the second pressure sensing element may be disposed within the second tubing port. In some embodiments, the second tubing port is disposed at a predetermined distance from the first tubing port.

Furthermore, in such embodiments, the pressure sensor may comprise a first torus piece surrounding the first tubing port, and a second torus piece surrounding the second tubing port. In some embodiments, the pressure sensor further comprises a third tubing port disposed on the first surface of the substrate, and a third pressure sensing element disposed on the first surface of the substrate and within the third tubing port.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 6A illustrates a side view of an example pressure sensor in accordance with various embodiments of the present disclosure;

DETAILED DESCRIPTION OF THE INVENTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The present disclosure provides example pressure sensor architectures that are optimized for sensing two or more separate pressures. For example, consumer products such as "smart shoes" or "smart boots" may require pressure sensors to measure and control pressures in different locations. Instead of utilizing two separate pressure sensors, the present disclosure provides example pressure sensor architectures with two or more integrated sensors. As a result of these architectures, material cost is reduced and overall manufacturability is improved.

FIGS. 1A-9 illustrate example pressure sensors in accordance with various embodiments of the present disclosure. While the present disclosure describes pressure sensors as examples, it is contemplated that embodiments of the present disclosure may be applicable to other types of sensors (which may include, for example, force sensors, temperature sensors, humidity sensors, flow sensors) and/or other combinations of sensors (which may include, for example, packaged pressure and temperature sensor with pressure sensing element(s) and temperature element(s)) without deviating from the scope of the present disclosure.

Figure 1A:
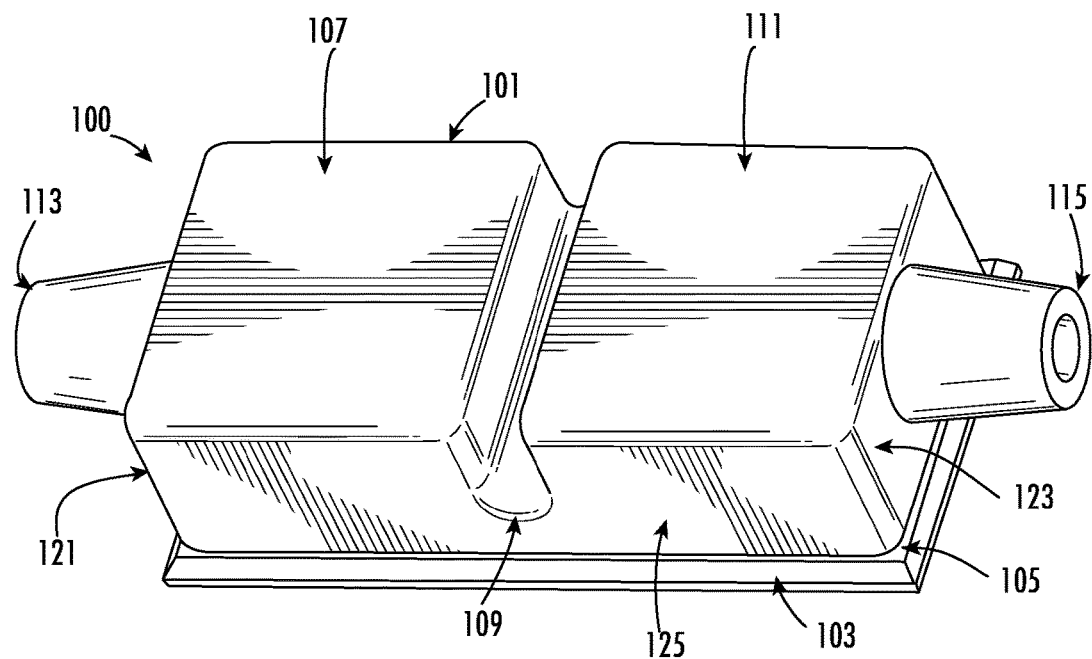
FIG. 1A illustrates a perspective view of an example pressure sensor in accordance with various embodiments of the present disclosure.
Figure 1B:
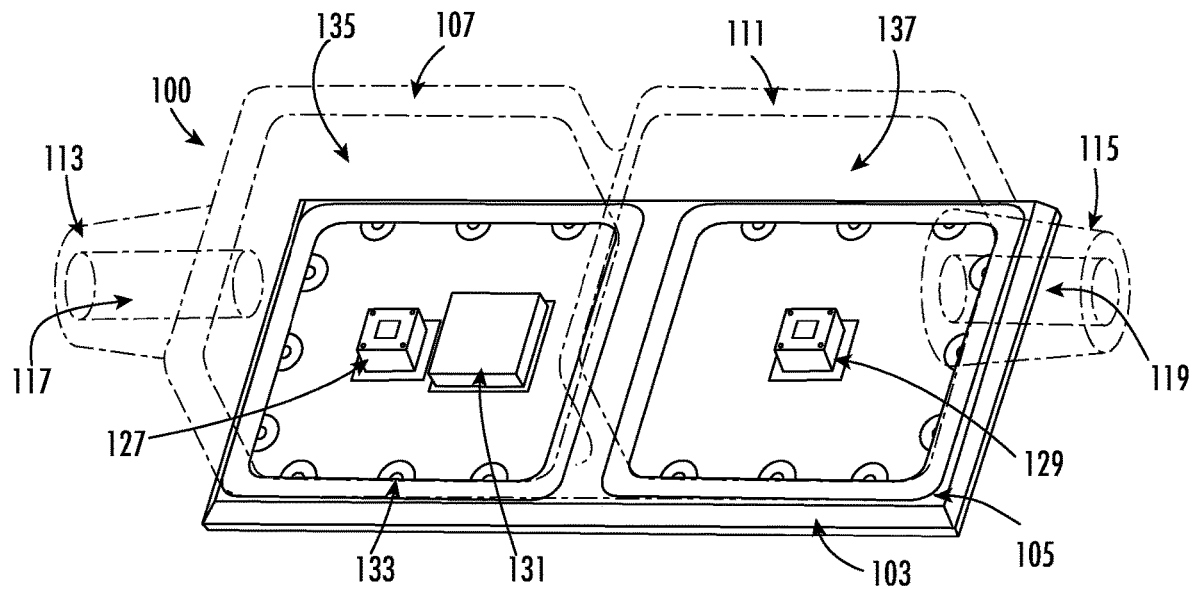
FIG. 1B illustrates an internal perspective view of an example pressure sensor in accordance with various embodiments of the present disclosure.

Referring now to FIGS. 1A and 1B, example perspective views of an example pressure sensor 100 are illustrated. As shown in FIG. 1A, the pressure sensor 100 comprises a housing member 101 and a substrate 103.

The substrate 103 may comprise a first surface 105, and a second surface (not visible in FIG. 1A) that is opposite from the first surface 105. In some embodiments, the substrate 103 may include material(s) that have flexible characteristics, such as, for example, rubber or silicon. In some embodiments, the substrate 103 may include material(s) such as ceramic or fiberglass that provides firm support on elements disposed on the first surface 105 of the substrate 103. In some embodiments, the substrate 103 may include other suitable materials or a combination of materials, including, for example, plastic.

The housing member 101 may include material(s) such as, for example, rubber, plastic, ceramic, and/or fiberglass. In some embodiments, the housing member 101 may include other suitable materials or a combination of materials without deviating from the scope of the present disclosure.

As illustrated in FIG. 1A, the housing member 101 is disposed on the first surface 105 of the substrate 103. In some embodiments, the housing member 101 may be disposed on and attached to the first surface 105 of the substrate 103 through adhesive material(s), such as, for example, epoxy, polyurethane. In some embodiments, the housing member 101 may be disposed and bonded on the first surface 105 of the substrate 103 through bonding mechanism(s) such as, for example, soldering through a lead-free solder.

For example, FIG. 1B illustrates an example soldering point 133. In some embodiments, the housing member 101 may be disposed on and connected to the first surface 105 of the substrate 103 through other mechanism(s) or a combination of mechanisms without deviating from the scope of the present disclosure.

In the embodiment as illustrated in FIG. 1A, the housing member 101 may comprise a first cover portion 107, a notch portion 109, and a second cover portion 111. In particular, the notch portion 109 provides an indentation on the housing member 101, resulting in the first cover portion 107 and the second cover portion 111. It is contemplated that, in various embodiments, the shape of the housing member 101 is not limited to the shape as illustrated in FIG. 1A, and may be in form of other shapes, without deviating from the scope of the present disclosure.

In some embodiments, the first cover portion 107 may include a first pressure port 113. The first pressure port 113 may include a first opening 117 (as shown in FIG. 1B), which may allow, for example, air to pass through the first pressure port 113 and into the cavity or cavities formed by the housing member 101 and the first surface 105 of the substrate 103 (as described in detail below). Similarly, the second cover portion 111 may include a second pressure port 115, which may include a second opening 119 (as shown in FIG. 1B).

Further, the housing member 101 may include different sides, such as a first side 121, a second side 123, and a third side 125. For example, the first side 121 may be in an orthogonal arrangement with the third side 125, and the second side 123 may be in an orthogonal arrangement with the third side 125.

In the embodiment as shown in FIG. 1A, the first pressure port 113 may be disposed on (and may protrude from) the first side 121 of the housing member 101, and the second pressure port 115 may be disposed on (and may protrude from) the second side 123 of the housing member 101. It is contemplated that, in various embodiments, the first pressure port 113 and/or the second pressure port 115 may be disposed on other side(s) of the housing member 101 (such as the third side 125), without deviating from the scope of the present disclosure. Some of such example embodiments are illustrated in FIGS. 3A-5 and described in detail in the present disclosure.

Figure 5:
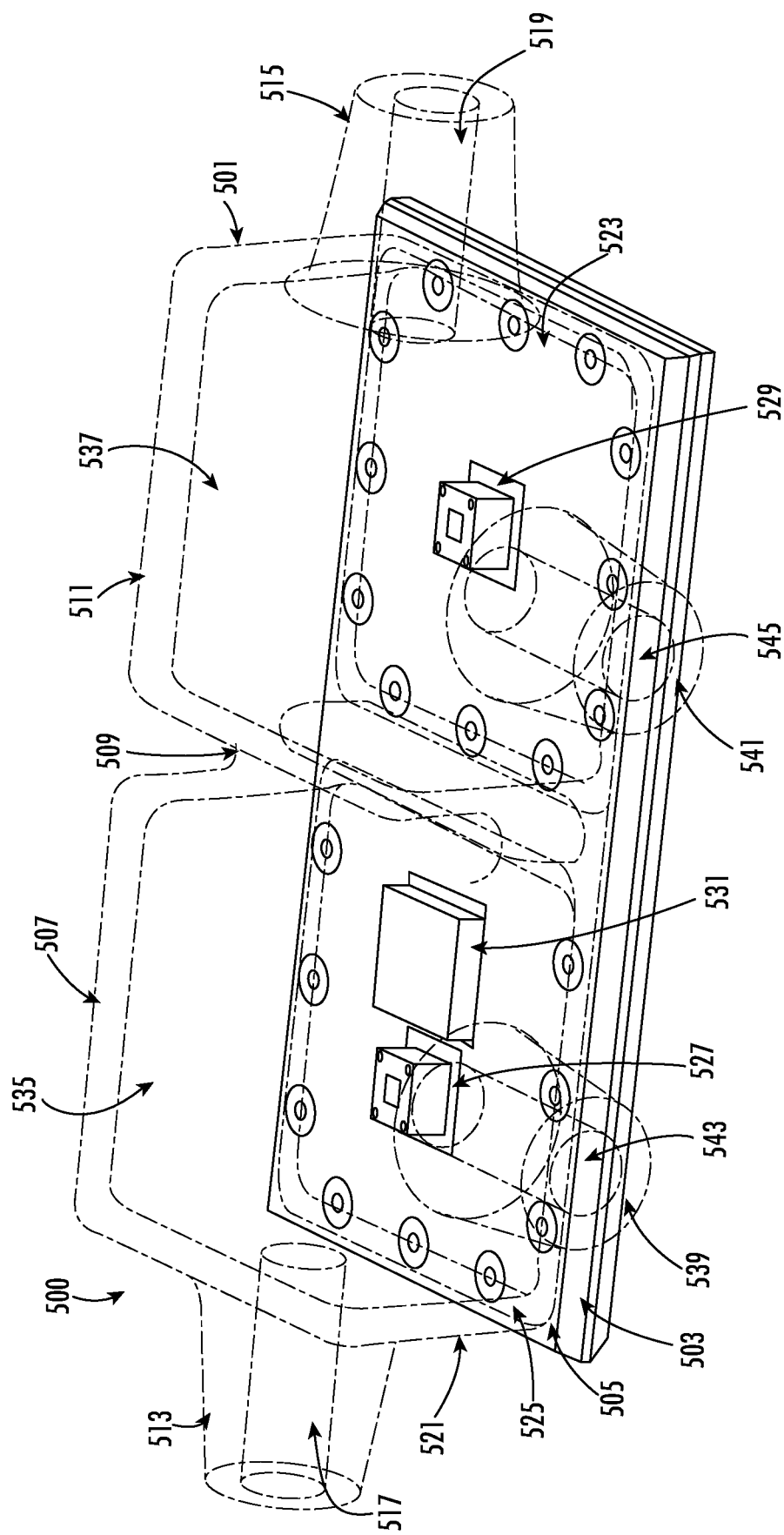
FIG. 5 illustrates an internal perspective view of an example pressure sensor in accordance with various embodiments of the present disclosure.

Further, while the embodiment shown in FIG. 1A illustrates two pressure ports, it is contemplated that less than two or more than two pressure ports may be disposed on the side(s) of the housing member 101 in various embodiments. For example, only one pressure port may be disposed on a side of the housing member 101 based on the application environment of the pressure sensor 100. As another example, four pressure ports may be disposed on the same of different sides of the housing member 101 (such an example is illustrated in FIG. 5 and described in detail in the present disclosure).

Referring now to FIG. 1B, an example perspective view of the pressure sensor 100, highlighting various elements disposed on the first surface 105 of the substrate 103, is illustrated. In particular, FIG. 1B illustrates the pressure sensor 100 with the housing 101 made transparent and depicted in dashed lines.

As described above, the housing member 101 and the first surface 105 of the substrate 103 may form one or more cavities. For example, in the embodiment as shown in FIG. 1B, the first cover portion 107 and the first surface 105 of the substrate 103 form a first cavity 135, and the second cover portion 111 and the first surface 105 of the substrate 103 form a second cavity 137.

In various embodiments, one or more sensing elements may be disposed on the first surface 105 of substrate 103 and housed within a cavity that is formed by the housing member 101 and the first surface 105 of the substrate 103. For example, in the embodiment as shown in FIG. 1B, a first pressure sensing element 127 is disposed on the first surface 105 of the substrate 103, and housed within the first cavity 135. A second pressure sensing element 129 is disposed on the first surface 105 of the substrate 103, and housed within the second cavity 137.

As used herein, the term "sensing element" refers to an apparatus that measures or detects a property associated with the location or environment surrounding the sensing element, and may further indicate, record, and/or output the record of the property. For example, a pressure sensing element is an apparatus for detecting and/or measuring pressure of air, gas, or liquid. A pressure sensing element may act as a transducer, which generates a signal as a function of the pressure detected or measured.

In some embodiments, a pressure sensing element may be a micro-electro-mechanical system (MEMS) device. The MEMS device may include miniaturized mechanical and electro-mechanical components for detecting and/or measuring pressure, and these components may be fabricated (such as through a microfabrication process) to form a functional circuit on a block of semiconducting material (such as a die). For example, referring back to FIG. 1B, in some embodiments, the first pressure sensing element 127 and the second pressure sensing element 129 may be MEMS pressure sensing dies.

According to various embodiments, the first pressure sensing element 127 and the second pressure sensing element 129 may be configured to detect and/or measure pressures associated with different locations and/or environments. For example, the first pressure sensing element 127 may be configured to measure pressure based on the environment associated with the first cavity 135, while the second pressure sensing element 129 may be configured to measure pressure based on the environment associated with the second cavity 137.

Figure 8:
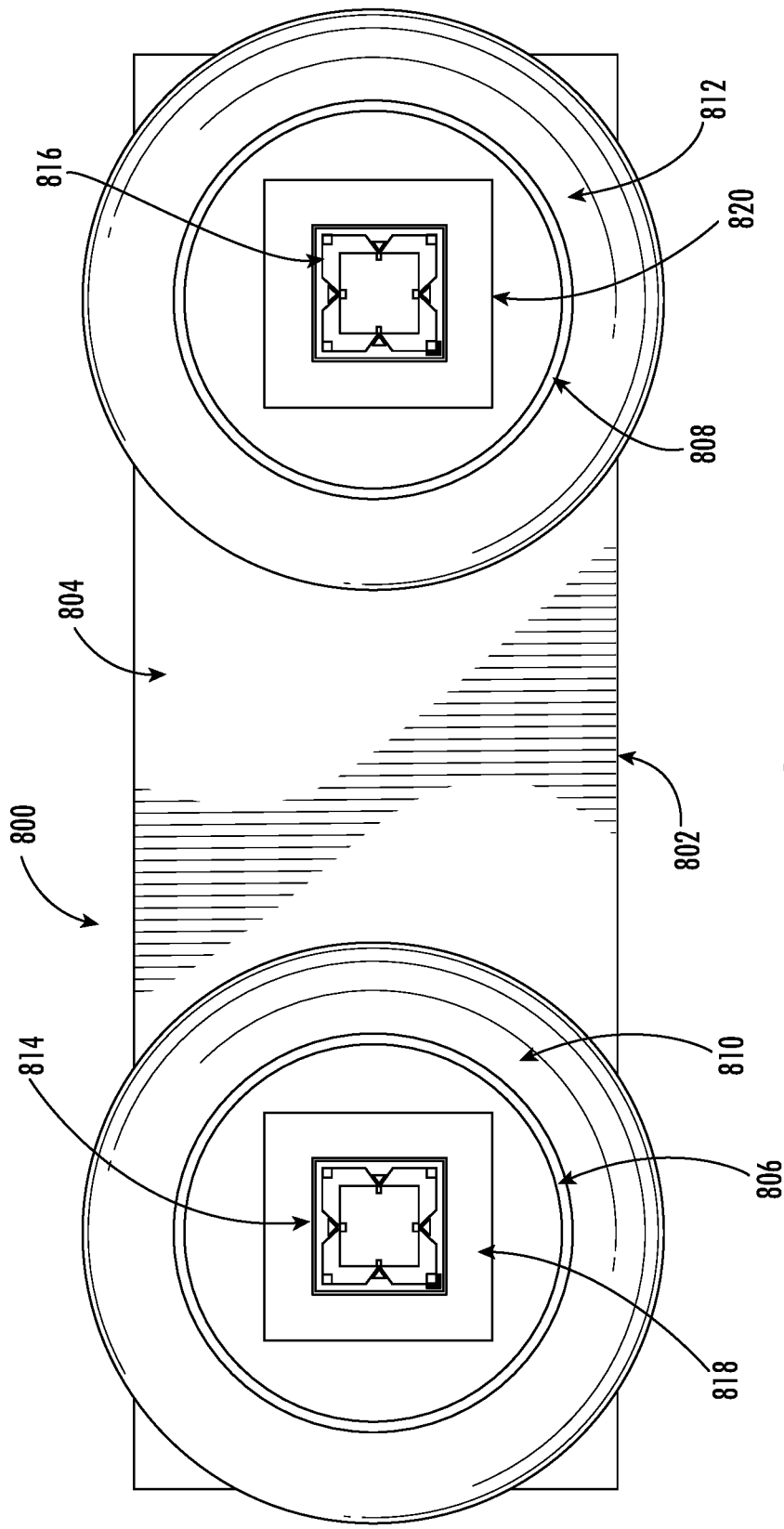
FIG. 8 illustrates a top view of an example pressure sensor in accordance with various embodiments of the present disclosure.
Figure 9:
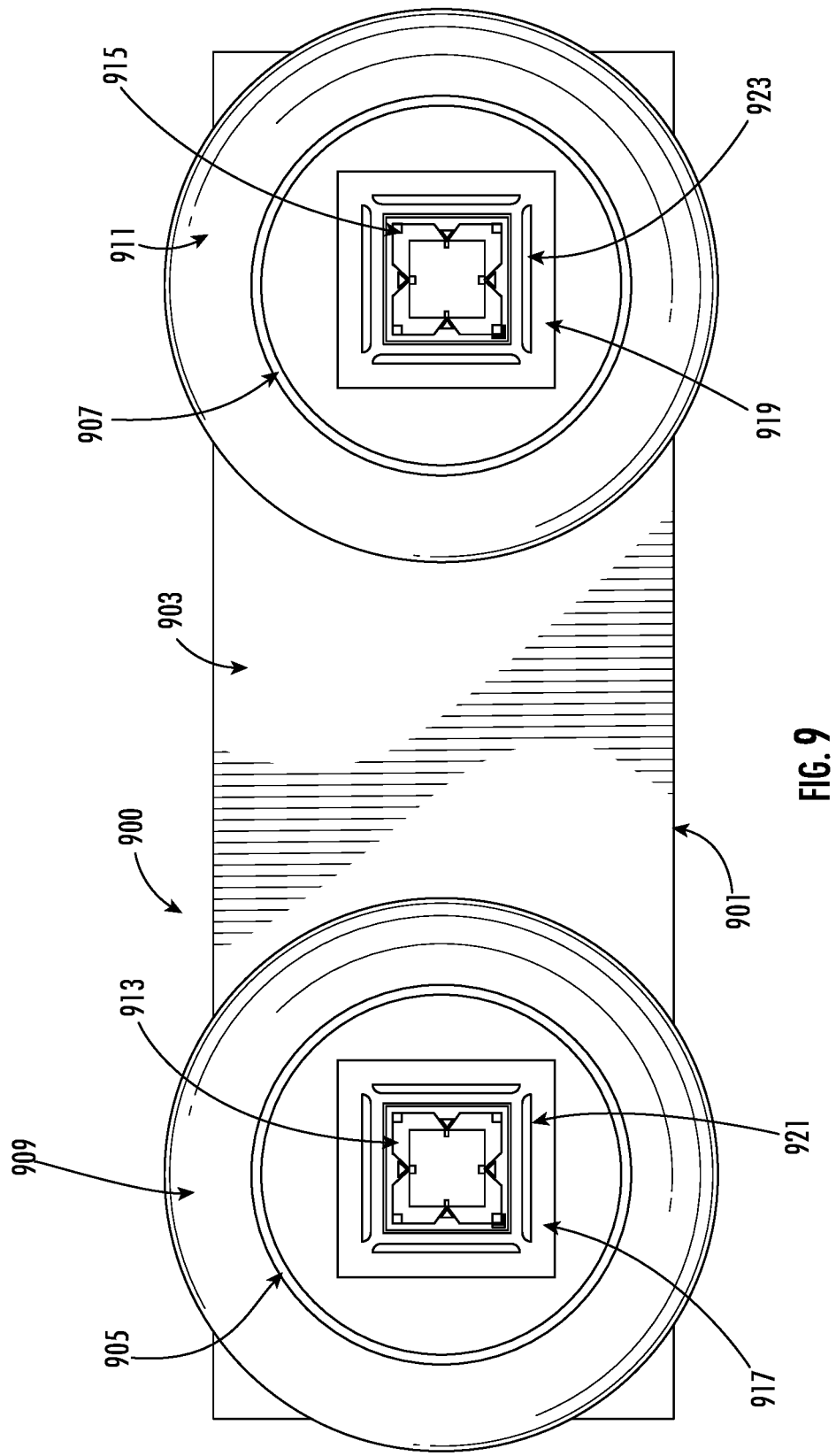
FIG. 9 illustrates a top view of an example pressure sensor in accordance with various embodiments of the present disclosure.

In some embodiments, the first pressure sensing element 127 and the second pressure sensing element 129 may be disposed on the first surface 105 of the substrate 103 through bonding mechanism(s) such as, for example, soldering through a lead-free solder. In some embodiments, the first pressure sensing element 127 and the second pressure sensing element 129 may be disposed on and attached to the first surface 105 of the substrate 103 through adhesive material(s), such as, for example, epoxy, polyurethane. In some embodiments, the first pressure sensing element 127 and the second pressure sensing element 129 may be disposed on the first surface 105 of the substrate 103 through one or more layers (examples of which are illustrated in FIGS. 8 and 9 and described in detail below).

Further, in various embodiments, sensor conditioning circuitry may be disposed on the first surface 105 of the substrate 103 and housed within a cavity that is formed by the housing member 101 and the first surface 105 of the substrate 103. For example, in the embodiment as shown in FIG. 1B, sensor conditioning circuitry 131 is disposed on the first surface 105 of the substrate 103, and housed within the first cavity 135.

As used herein, the term "sensor conditioning circuitry" refers to a circuitry that perform functions on one or more input signals to generate one or more output signals, and the output signals may meet certain requirements for signal processing. Example functions may include, for example, amplification, multiplex, conversion (such as analog-to-digital conversion), compensation, and/or linearization.

In some examples, the sensor conditioning circuitry may implement an application-specific integrated circuit (ASIC). In these examples, the ASIC is an integrated circuit that may be customized for signal conditioning. In some examples, the ASIC may be fully customized or semi-customized for the particular application of signal conditioning. In some examples, the ASIC may be a programmable ASIC that allows circuit reconfiguration.

Referring back to FIG. 1B, the sensor conditioning circuitry 131 may be electronically coupled to the first pressure sensing element 127 and the second pressure sensing element 129. The sensor conditioning circuitry 131 may receive the output signals from the first pressure sensing element 127 and the second pressure sensing element 129, which may indicate the presence and/or measurement(s) of pressure(s) in the corresponding location or environment. The sensor conditioning circuitry 131 may further output one or more output signals after function(s) are performed on the signals received from the first pressure sensing element 127 and the second pressure sensing element 129.

It is contemplated that one or more additional elements may provide or supplement the functionality of sensor conditioning circuitry 131. For example, in some embodiments, the pressure sensor 100 may further include a signal amplifying circuitry that is electronically coupled to the first pressure sensing element 127, the second pressure sensing element 129, and the sensor conditioning circuitry 131. The signal amplifying circuitry may amplify signal(s) it receives from, for example, the first pressure sensing element 127 and the second pressure sensing element 129, and may output amplified signal(s) to the sensor conditioning circuitry 131.

As described above, some embodiments of the present disclosure provide cost-effective sensor architecture. For example, in the example embodiments as shown in FIG. 1B, by electronically coupling only one sensor conditioning circuitry to two pressure sensing elements (all disposed on the same substrate), material cost for manufacturing the pressure sensor may be reduced (e.g., by eliminating the need for two separate integrated circuits coupled, respectively, to the two pressure sensing elements). In addition, sensors that are manufactured in accordance with various embodiments of the present disclosure are leadless. For example, the pressure sensing elements and the sensor conditioning circuitry may be electrically coupled through, for example, glass material, which eliminates the need for gold wires and provides a leadless package.

In this regard, various embodiments of the present disclosure may provide example methods for manufacturing a pressure sensor. For example, the pressure sensor 100 as shown in FIGS. 1A-1B may be manufactured by soldering the first pressure sensing element 127, the second pressure sensing element 129, and the sensor conditioning circuitry 131 to the first surface 105 of the substrate 103, and soldering the housing member 101 to the first surface 105 of the substrate 103.

Figure 2A:
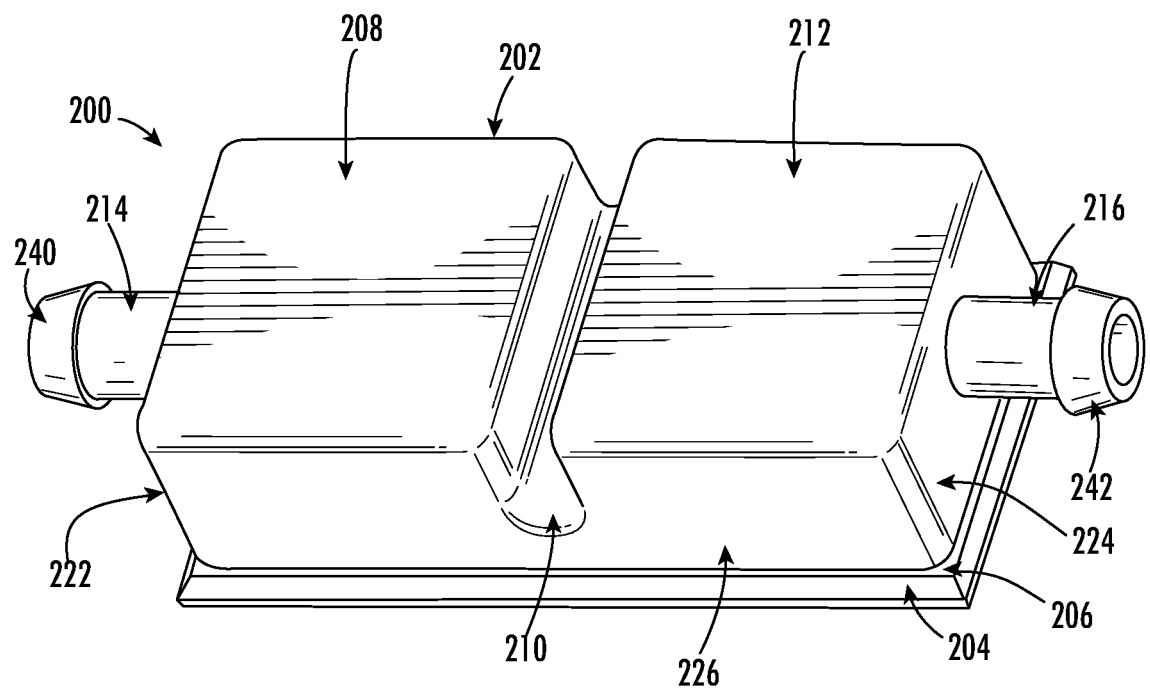
FIG. 2A illustrates a perspective view of an example pressure sensor in accordance with various embodiments of the present disclosure.
Figure 2B:
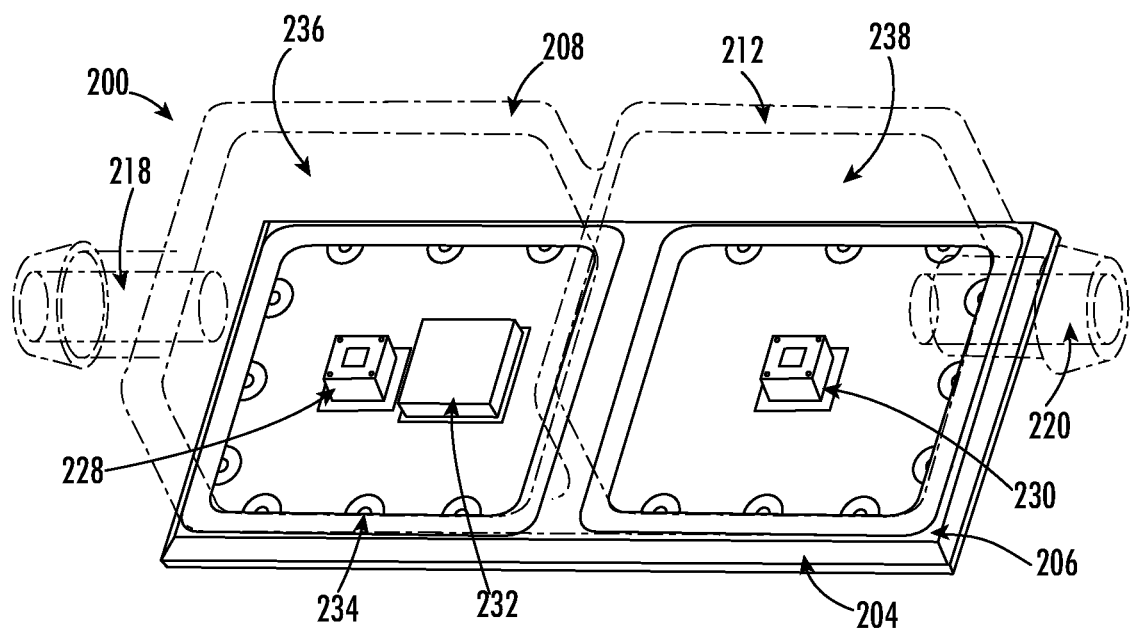
FIG. 2B illustrates an internal perspective view of an example pressure sensor in accordance with various embodiments of the present disclosure.

Referring now to FIGS. 2A and 2B, example perspective views of an example pressure sensor 200 are illustrated. As shown in FIG. 2A, the pressure sensor 200 comprises a housing member 202 and a substrate 204.

The substrate 204 may comprise a first surface 206, and a second surface that is opposite from the first surface 206.

Similar to the substrate 103 described above in connection with FIGS. 1A-1B, the substrate 204 may include material(s) such as, for example, silicon, ceramic, fiberglass, plastic and/or other suitable material(s).

Similar to the housing member 101 described above in connection with FIGS. 1A-1B, the housing member 202 may include material(s) such as, for example, rubber, plastic, ceramic, and/or fiberglass. In some embodiments, the housing member 202 may include other suitable materials or a combination of materials without deviating from the scope of the present disclosure.

As illustrated in FIG. 2A, the housing member 202 is disposed on the first surface 206 of the substrate 204. In some embodiments, the housing member 202 may be disposed on and attached to the first surface 206 of the substrate 204 using adhesive material(s), such as, for example, epoxy, polyurethane. In some embodiments, the housing member 202 may be disposed and bonded on the first surface 206 of the substrate 204 through bonding mechanism(s) such as, for example, soldering through a lead-free solder. For example, FIG. 2B illustrates an example soldering point 234. In some embodiments, the housing member 202 may be disposed on and connected to the first surface 206 of the substrate 204 through other mechanism(s) or a combination of mechanisms without deviating from the scope of the present disclosure.

In the embodiment as illustrated in FIG. 2A, the housing member 202 may comprise a first cover portion 208, a notch portion 210, and a second cover portion 212. Similar to the housing member 101 described above in connection with FIGS. 1A-1B, the notch portion 210 provides an indentation on the housing member 202, resulting in the first cover portion 208 and the second cover portion 212. It is contemplated that, in various embodiments, the shape of the housing member 202 is not limited to the shape as illustrated in FIG. 2A, and may be in form of other shapes, without deviating from the scope of the present disclosure.

In some embodiments, the first cover portion 208 may include a first pressure port 214. The first pressure port 214 may include a first opening 218 (as shown in FIG. 2B), which may allow, for example, air to pass through the first pressure port 214 and into the cavity or cavities formed by the housing member 202 and the first surface 206 of the substrate 204 (as described in detail below). The first pressure port 214 may also include a first barb 240. Similarly, the second cover portion 212 may include a second pressure port 216, which may include a second opening 220 (as shown in FIG. 2B). The second pressure port 216 may also include a second barb 242.

Further, the housing member 202 may include different sides, such as a first side 222, a second side 224, and a third side 226. For example, the first side 222 may be in an orthogonal arrangement with the third side 226, and the second side 224 may be in an orthogonal arrangement with the third side 226. In the embodiment as shown in FIG. 2A, the first pressure port 214 may be disposed on (and may protrude from) the first side 222 of the housing member 202, and the second pressure port 216 may be disposed on (and may protrude from) the second side 224 of the housing member 202.

Referring now to FIG. 2B, an example perspective view of the pressure sensor 200, highlighting various elements disposed on the first surface 206 of the substrate 204, is illustrated.

As described above, the housing member 202 and the first surface 206 of the substrate 204 may form one or more cavities. For example, in the embodiment as shown in FIG.

2B, the first cover portion 208 and the first surface 206 of the substrate 204 form a first cavity 236, and the second cover portion 212 and the first surface 206 of the substrate 204 form a second cavity 238.

In various embodiments, one or more sensing elements may be disposed on the first surface 206 of substrate 204 and housed within a cavity that is formed by the housing member 202 and the first surface 206 of the substrate 204. For example, in the embodiment as shown in FIG. 2B, a first pressure sensing element 228 is disposed on the first surface 206 of the substrate 204, and housed within the first cavity 236. A second pressure sensing element 230 is disposed on the first surface 206 of the substrate 204, and housed within the second cavity 238.

Similar to the first pressure sensing element 127 and the second pressure sensing element 129 described above in connection with FIGS. 1A-1B, the first pressure sensing element 228 and the second pressure sensing element 230 may be MEMS pressure sensing dies. In some embodiments, the first pressure sensing element 228 and the second pressure sensing element 230 may be disposed on the first surface 206 of the substrate 204 through, for example, bonding mechanism(s) (such as soldering through a lead-free solder) and/or adhesive material(s) (such as epoxy, polyurethane).

Further, in various embodiments, sensor conditioning circuitry (such as a signal conditioning ASIC) may be disposed on the first surface 206 of the substrate 204 and housed within a cavity that is formed by the housing member 202 and the first surface 206 of the substrate 204. For example, in the embodiment as shown in FIG. 2B, sensor conditioning circuitry 232 is disposed on the first surface 206 of the substrate 204, and housed within the first cavity 236.

Similar to the sensor conditioning circuitry 131 described above in connection with FIGS. 1A-1B, the sensor conditioning circuitry 232 may be electronically coupled to the first pressure sensing element 228 and the second pressure sensing element 230. The sensor conditioning circuitry 232 may receive the output signals from the first pressure sensing element 228 and the second pressure sensing element 230, which may indicate the presence and/or measurement(s) of pressure(s) in the corresponding location or environment. The sensor conditioning circuitry 232 may further output one or more output signals after function(s) are performed on the signals received from the first pressure sensing element 228 and the second pressure sensing element 230.

Figure 3A:
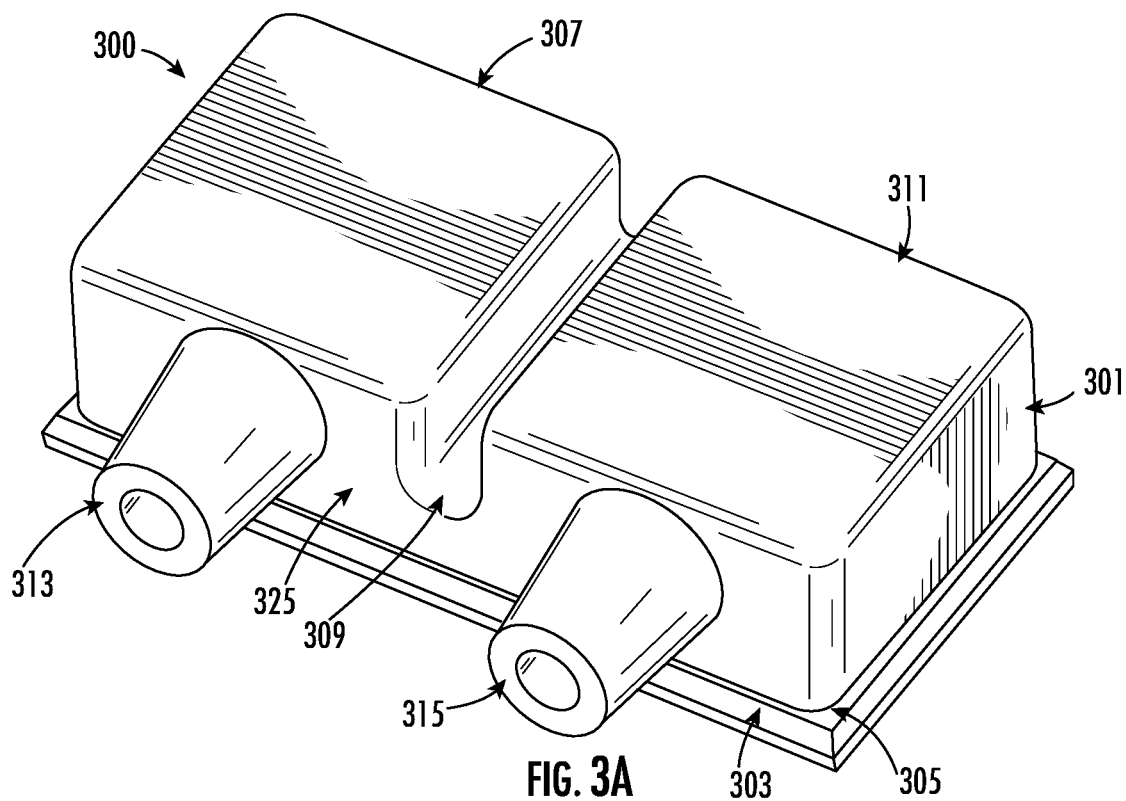
FIG. 3A illustrates a perspective view of an example pressure sensor in accordance with various embodiments of the present disclosure.
Figure 3B:
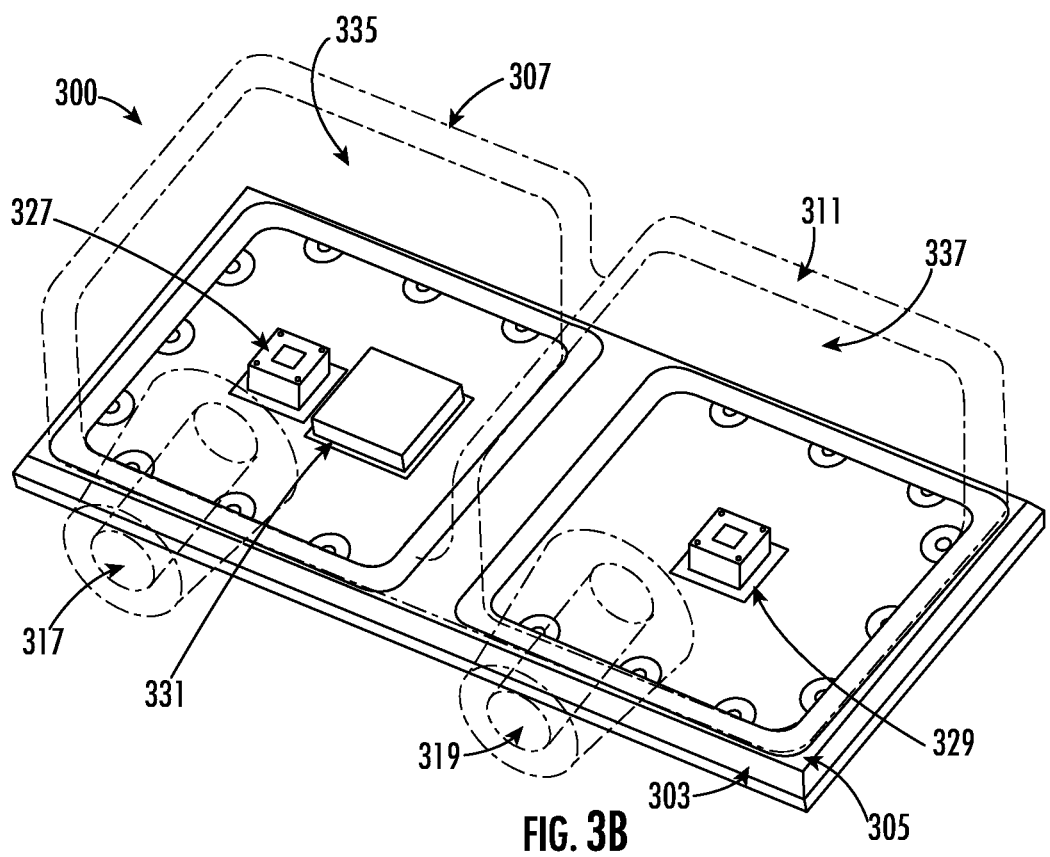
FIG. 3B illustrates an internal perspective view of an example pressure sensor in accordance with various embodiments of the present disclosure.

Referring now to FIGS. 3A and 3B, example perspective views of an example pressure sensor 300 are illustrated. As shown in FIG. 3A, the pressure sensor 300 comprises a housing member 301 and a substrate 303.

The substrate 303 may comprise a first surface 305, and a second surface that is opposite from the first surface 305. Similar to the substrate 103 described above in connection with FIGS. 1A-1B, the substrate 303 may include material(s) such as, for example, silicon, ceramic, fiberglass, plastic and/or other suitable material(s).

Similar to the housing member 101 described above in connection with FIGS. 1A-1B, the housing member 301 may include material(s) such as, for example, rubber, plastic, ceramic, and/or fiberglass. In some embodiments, the housing member 301 may include other suitable materials or a combination of materials without deviating from the scope of the present disclosure.

As illustrated in FIG. 3A, the housing member 301 is disposed on the first surface 305 of the substrate 303. In some embodiments, the housing member 301 may be disposed on and attached to the first surface 305 of the substrate 303 using adhesive material(s), such as, for example, epoxy, polyurethane. In some embodiments, the housing member 301 may be disposed and bonded on the first surface 305 of the substrate 303 through bonding mechanism(s) such as, for example, soldering through a lead-free solder. In some embodiments, the housing member 301 may be disposed on and connected to the first surface 305 of the substrate 303 through other mechanism(s) or a combination of mechanisms without deviating from the scope of the present disclosure.

In the embodiment as illustrated in FIG. 3A, the housing member 301 may comprise a first cover portion 307, a notch portion 309, and a second cover portion 311. Similar to the housing member 101 described above in connection with FIGS. 1A-1B, the notch portion 309 provides an indentation on the housing member 301, resulting in the first cover portion 307 and the second cover portion 311. It is contemplated that, in various embodiments, the shape of the housing member 301 is not limited to the shape as illustrated in FIG. 3A, and may be in form of other shapes, without deviating from the scope of the present disclosure.

In some embodiments, the first cover portion 307 may include a first pressure port 313. The first pressure port 313 may include a first opening 317 (as shown in FIG. 3B). Similarly, the second cover portion 311 may include a second pressure port 315, which may include a second opening 319 (as shown in FIG. 3B).

Further, the housing member 301 may include a first side 325. In the embodiment as shown in FIG. 3A, the first pressure port 313 and the second pressure port 315 may be disposed on (and may protrude from) the first side 325. In some embodiments, the first pressure port 313 may be in a parallel arrangement with the second pressure port 315.

Referring now to FIG. 3B, an example perspective view of the pressure sensor 300, highlighting various elements disposed on the first surface 305 of the substrate 303, is illustrated.

As described above, the housing member 301 and the first surface 305 of the substrate 303 may form one or more cavities. For example, in the embodiment as shown in FIG. 3B, the first cover portion 307 and the first surface 305 of the substrate 303 form a first cavity 335, and the second cover portion 311 and the first surface 305 of the substrate 303 form a second cavity 337.

In various embodiments, one or more sensing elements may be disposed on the first surface 305 of substrate 303 and housed within a cavity that is formed by the housing member 301 and the first surface 305 of the substrate 303. For example, in the embodiment as shown in FIG. 3B, a first pressure sensing element 327 is disposed on the first surface 305 of the substrate 303, and housed within the first cavity 335. A second pressure sensing element 329 is disposed on the first surface 305 of the substrate 303, and housed within the second cavity 337.

Similar to the first pressure sensing element 127 and the second pressure sensing element 129 described above in connection with FIGS. 1A-1B, the first pressure sensing element 327 and the second pressure sensing element 329 may be MEMS pressure sensing dies. In some embodiments, the first pressure sensing element 327 and the second pressure sensing element 329 may be disposed on the first surface 305 of the substrate 303 through, for example, bonding mechanism(s) (such as soldering through a lead-free solder) and/or adhesive material(s) (such as epoxy, polyurethane).

Further, in various embodiments, sensor conditioning circuitry (such as a signal conditioning ASIC) may be disposed on the first surface 305 of the substrate 303 and housed within a cavity that is formed by the housing member 301 and the first surface 305 of the substrate 303. For example, in the embodiment as shown in FIG. 3B, sensor conditioning circuitry 331 is disposed on the first surface 305 of the substrate 303, and housed within the first cavity 335.

Similar to the sensor conditioning circuitry 131 described above in connection with FIGS. 1A-1B, the sensor conditioning circuitry 331 may be electronically coupled to the first pressure sensing element 327 and the second pressure sensing element 329. The sensor conditioning circuitry 331 may receive the output signals from the first pressure sensing element 327 and the second pressure sensing element 329, which may indicate the presence and/or measurement(s) of pressure in the corresponding location or environment. The sensor conditioning circuitry 331 may further output one or more output signals after function(s) are performed on the signals received from the first pressure sensing element 327 and the second pressure sensing element 329.

Figure 4A:
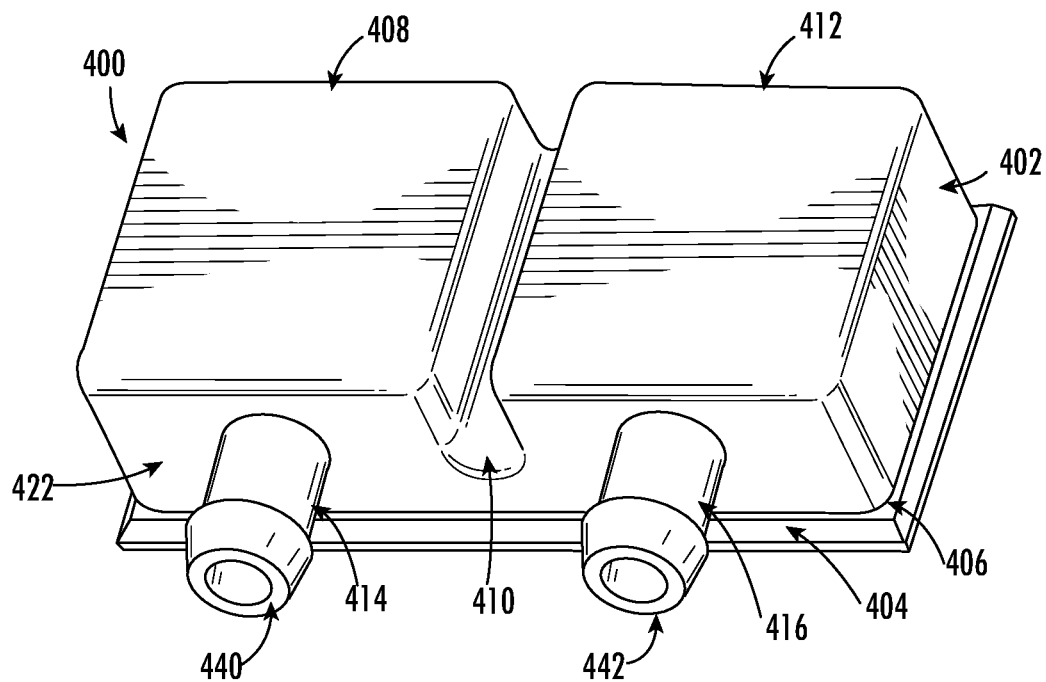
FIG. 4A illustrates a perspective view of an example pressure sensor in accordance with various embodiments of the present disclosure.
Figure 4B:
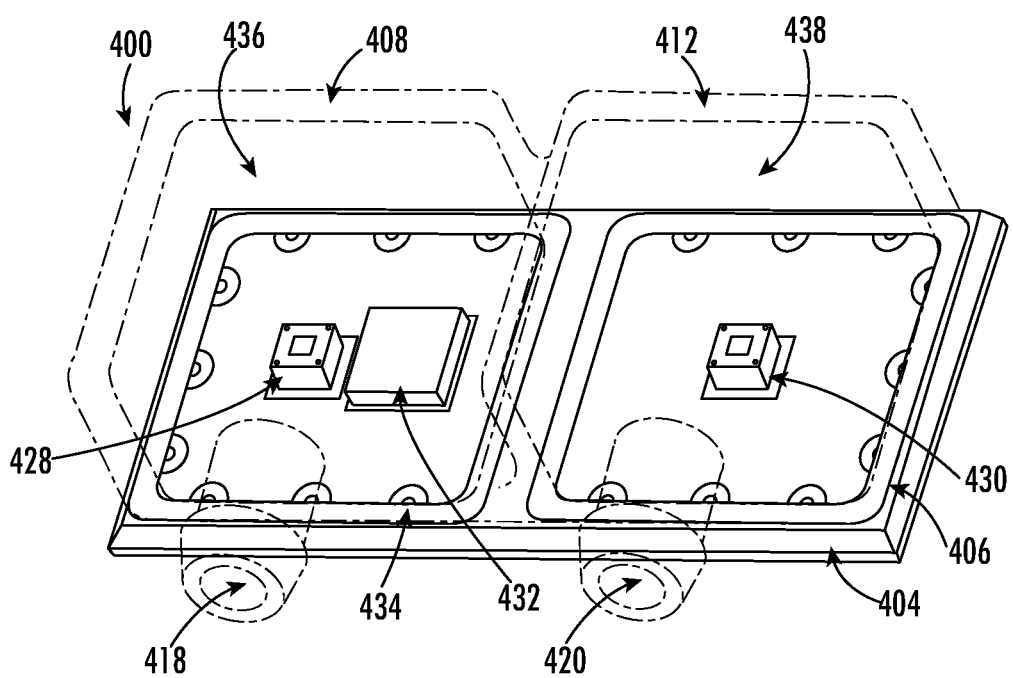
FIG. 4B illustrates an internal perspective view of an example pressure sensor in accordance with various embodiments of the present disclosure.

Referring now to FIGS. 4A and 4B, example perspective views of an example pressure sensor 400 are illustrated. As shown in FIG. 4A, the pressure sensor 400 comprises a housing member 402 and a substrate 404.

The substrate 404 may comprise a first surface 406, and a second surface that is opposite from the first surface 406. Similar to the substrate 103 described above in connection with FIGS. 1A-1B, the substrate 404 may include material(s) such as, for example, silicon, ceramic, fiberglass, plastic and/or other suitable material(s).

Similar to the housing member 101 described above in connection with FIGS. 1A-1B, the housing member 402 may include material(s) such as, for example, rubber, plastic, ceramic, and/or fiberglass. In some embodiments, the housing member 402 may include other suitable materials or a combination of materials without deviating from the scope of the present disclosure.

As illustrated in FIG. 4A, the housing member 402 is disposed on the first surface 406 of the substrate 404. In some embodiments, the housing member 402 may be disposed on and attached to the first surface 406 of the substrate 404 using adhesive material(s), such as, for example, epoxy, polyurethane. In some embodiments, the housing member 402 may be disposed and bonded on the first surface 406 of the substrate 404 through bonding mechanism(s) such as, for example, soldering through a lead-free solder. For example, FIG. 4 illustrates an example soldering point 434. In some embodiments, the housing member 402 may be disposed on and connected to the first surface 406 of the substrate 404 through other mechanism(s) or a combination of mechanisms without deviating from the scope of the present disclosure.

In the embodiment as illustrated in FIG. 4A, the housing member 402 may comprise a first cover portion 408, a notch portion 410, and a second cover portion 412. Similar to the housing member 101 described above in connection with FIGS. 1A-1B, the notch portion 410 provides an indentation on the housing member 402, resulting in the first cover portion 408 and the second cover portion 412. It is contemplated that, in various embodiments, the shape of the housing member 402 is not limited to the shape as illustrated in FIG. 4A, and may be in form of other shapes, without deviating from the scope of the present disclosure.

In some embodiments, the first cover portion 408 may include a first pressure port 414. The first pressure port 414 may include a first opening 418 (as shown in FIG. 4B), which may allow, for example, air to pass through the first pressure port 414 and into the cavity or cavities formed by the housing member 402 and the first surface 406 of the substrate 404 (as described in detail below). The first pressure port 414 may also include a first barb 440. Similarly, the second cover portion 412 may include a second pressure port 416, which may include a second opening 420 (as shown in FIG. 4B). The second pressure port 416 may also include a second barb 442.

Further, the housing member 402 may include a first side 422. In the embodiment as shown in FIG. 4A, the first pressure port 414 and the second pressure port 416 may be disposed on (and may protrude from) the first side 422 of the housing member 402. In some embodiments, the first pressure port 414 may be in a parallel arrangement with the second pressure port 416.

Referring now to FIG. 4B, an example perspective view of the pressure sensor 400, highlighting various elements disposed on the first surface 406 of the substrate 404, is illustrated.

As described above, the housing member 402 and the first surface 406 of the substrate 404 may form one or more cavities. For example, in the embodiment as shown in FIG. 4B, the first cover portion 408 and the first surface 406 of the substrate 404 form a first cavity 436, and the second cover portion 412 and the first surface 406 of the substrate 404 form a second cavity 438.

In various embodiments, one or more sensing elements may be disposed on the first surface 406 of substrate 404 and housed within a cavity that is formed by the housing member 402 and the first surface 406 of the substrate 404. For example, in the embodiment as shown in FIG. 4B, a first pressure sensing element 428 is disposed on the first surface 406 of the substrate 404, and housed within the first cavity 436. A second pressure sensing element 430 is disposed on the first surface 406 of the substrate 404, and housed within the second cavity 438.

Similar to the first pressure sensing element 127 and the second pressure sensing element 129 described above in connection with FIGS. 1A-1B, the first pressure sensing element 428 and the second pressure sensing element 430 may be MEMS pressure sensing dies. In some embodiments, the first pressure sensing element 428 and the second pressure sensing element 430 may be disposed on the first surface 406 of the substrate 404 through, for example, bonding mechanism(s) (such as soldering through a lead-free solder) and/or adhesive material(s) (such as epoxy, polyurethane).

Further, in various embodiments, sensor conditioning circuitry (such as a signal conditioning ASIC) may be disposed on the first surface 406 of the substrate 404 and housed within a cavity that is formed by the housing member 402 and the first surface 406 of the substrate 404. For example, in the embodiment as shown in FIG. 4B, sensor conditioning circuitry 432 is disposed on the first surface 406 of the substrate 404, and housed within the first cavity 436.

Similar to the sensor conditioning circuitry 131 described above in connection with FIGS. 1A-1B, the sensor conditioning circuitry 432 may be electronically coupled to the first pressure sensing element 428 and the second pressure sensing element 430. The sensor conditioning circuitry 432 may receive the output signals from the first pressure sensing element 428 and the second pressure sensing element 430, which may indicate the presence and/or measurement(s) of pressure in the corresponding location or environment. The sensor conditioning circuitry 432 may further output one or more output signals after function(s) are performed on the signals received from the first pressure sensing element 428 and the second pressure sensing element 430.

Referring now to FIG. 5, an example perspective view of an example pressure sensor 500 is illustrated. As shown in FIG. 5, the pressure sensor 500 comprises a housing member 501 and a substrate 503.

The substrate 503 may comprise a first surface 505, and a second surface that is opposite from the first surface 505. Similar to the substrate 103 described above in connection with FIGS. 1A-1B, the substrate 503 may include material(s) such as, for example, silicon, ceramic, fiberglass, plastic and/or other suitable material(s).

Similar to the housing member 101 described above in connection with FIGS. 1A-1B, the housing member 501 may include material(s) such as, for example, rubber, plastic, ceramic, and/or fiberglass. In some embodiments, the housing member 501 may include other suitable materials or a combination of materials without deviating from the scope of the present disclosure.

As illustrated in FIG. 5, the housing member 501 is disposed on the first surface 505 of the substrate 503. In some embodiments, the housing member 501 may be disposed on and attached to the first surface 505 of the substrate 503 using adhesive material(s), such as, for example, epoxy, polyurethane. In some embodiments, the housing member 501 may be disposed and bonded on the first surface 505 of the substrate 503 through bonding mechanism(s) such as, for example, soldering through a lead-free solder. In some embodiments, the housing member 501 may be disposed on and connected to the first surface 505 of the substrate 503 through other mechanism(s) or a combination of mechanisms without deviating from the scope of the present disclosure.

In the embodiment as illustrated in FIG. 5, the housing member 501 may comprise a first cover portion 507, a notch portion 509, and a second cover portion 511. Similar to the housing member 101 described above in connection with FIGS. 1A-1B, the notch portion 509 provides an indentation on the housing member 501, resulting in the first cover portion 507 and the second cover portion 511. It is contemplated that, in various embodiments, the shape of the housing member 501 is not limited to the shape as illustrated in FIG. 5, and may be in form of other shapes, without deviating from the scope of the present disclosure.

In some embodiments, the first cover portion 507 may include a first pressure port 513 and a second pressure port 539. The first pressure port 513 may include a first opening 517, and the second pressure port 539 may include a second opening 543. Similarly, the second cover portion 111 may include a third pressure port 515 and a fourth pressure port 541. The third pressure port 515 may include a third opening 519, and the fourth pressure port 541 may include a fourth opening 545.

Further, the housing member 101 may include different sides, such as a first side 521, a second side 523, and a third side 525. For example, the first side 521 may be in an orthogonal arrangement with the third side 525, and the second side 523 may be in an orthogonal arrangement with the third side 525.

In the embodiment as shown in FIG. 5, the first pressure port 513 may be disposed on (and may protrude from) the first side 521 of the housing member 501. The third pressure port 515 may be disposed on (and may protrude from) the second side 523 of the housing member 501. The second pressure port 539 and the fourth pressure port 541 may be disposed on the third side 525.

As described above, the housing member 501 and the first surface 505 of the substrate 503 may form one or more cavities. For example, in the embodiment as shown in FIG. 5, the first cover portion 507 and the first surface 505 of the substrate 503 form a first cavity 535, and the second cover portion 511 and the first surface 505 of the substrate 503 form a second cavity 537.

In various embodiments, one or more sensing elements may be disposed on the first surface 505 of substrate 503 and housed within a cavity that is formed by the housing member 501 and the first surface 505 of the substrate 503. For example, in the embodiment as shown in FIG. 5, a first pressure sensing element 527 is disposed on the first surface 505 of the substrate 503, and housed within the first cavity 535. A second pressure sensing element 529 is disposed on the first surface 505 of the substrate 503, and housed within the second cavity 537.

Similar to the first pressure sensing element 127 and the second pressure sensing element 129 described above in connection with FIGS. 1A-1B, the first pressure sensing element 527 and the second pressure sensing element 529 may be MEMS pressure sensing dies. In some embodiments, the first pressure sensing element 527 and the second pressure sensing element 529 may be disposed on the first surface 505 of the substrate 503 through, for example, bonding mechanism(s) (such as soldering through a lead-free solder) and/or adhesive material(s) (such as epoxy, polyurethane).

Further, in various embodiments, sensor conditioning circuitry (such as a signal conditioning ASIC) may be disposed on the first surface 505 of the substrate 503 and housed within a cavity that is formed by the housing member 501 and the first surface 505 of the substrate 503. For example, in the embodiment as shown in FIG. 5, sensor conditioning circuitry 531 is disposed on the first surface 505 of the substrate 503, and housed within the first cavity 535.

Similar to the sensor conditioning circuitry 131 described above in connection with FIGS. 1A-1B, the sensor conditioning circuitry 531 may be electronically coupled to the first pressure sensing element 527 and the second pressure sensing element 529. The sensor conditioning circuitry 531 may receive the output signals from the first pressure sensing element 527 and the second pressure sensing element 529, which may indicate the presence and/or measurement(s) of pressure in the corresponding location or environment. The sensor conditioning circuitry 531 may further output one or more output signals after function(s) are performed on the signals received from the first pressure sensing element 527 and the second pressure sensing element 529.

Figure 6B:
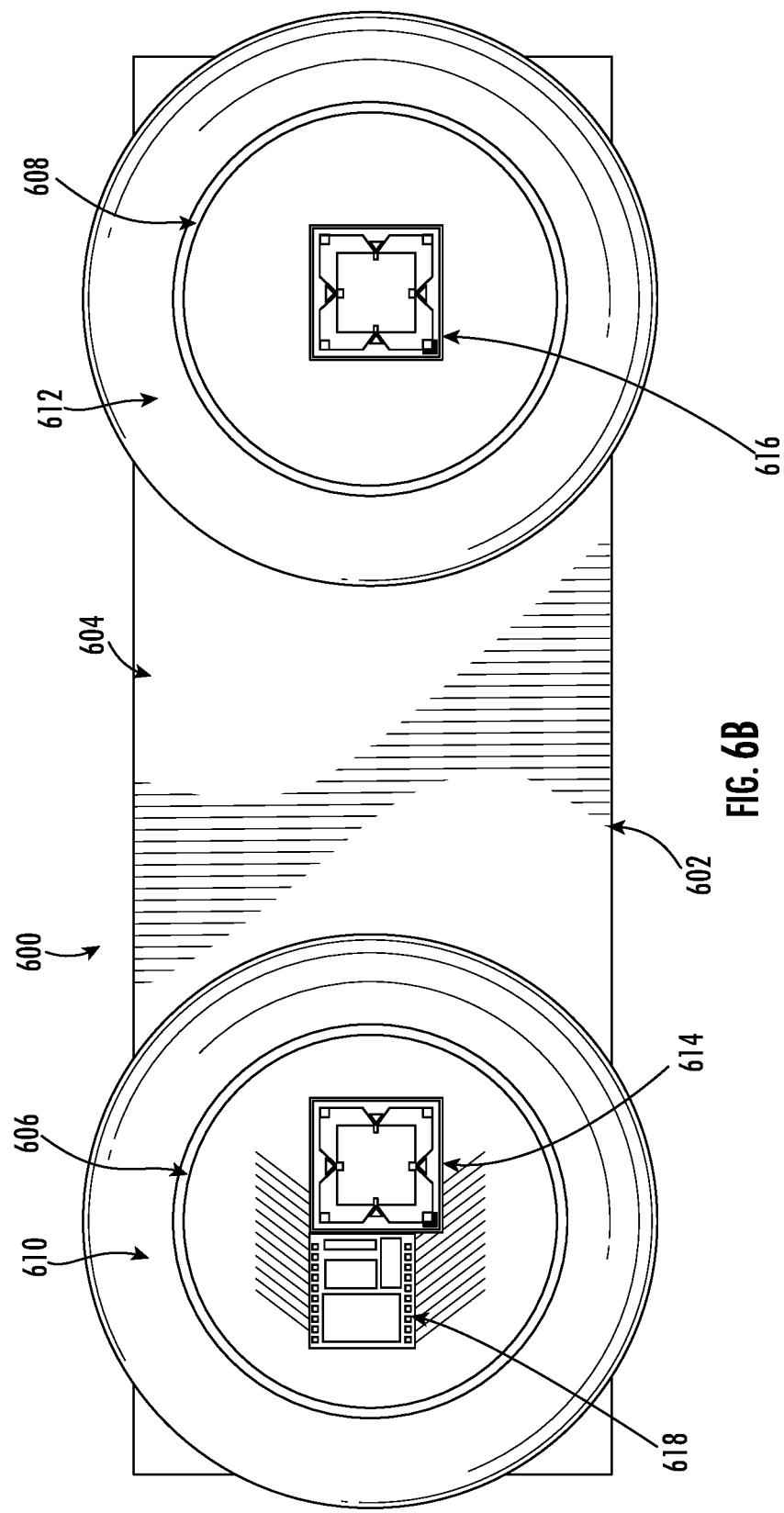
FIG. 6B illustrates a top view of an example pressure sensor in accordance with various embodiments of the present disclosure.

Referring now to FIGS. 6A and 6B, an example side view (FIG. 6A) and an example top view (FIG. 6B) of an example pressure sensor 600 are illustrated.

As shown in FIG. 6A, the pressure sensor 600 may include a substrate 602. Similar to the substrate 103 described above in connection with FIGS. 1A-1B, the substrate 602 may include material(s) such as, for example, silicon, ceramic, fiberglass, plastic and/or other suitable material(s).

The substrate 602 may comprise a first surface 604, and one or more tubing ports may be disposed on the first surface 604. For example, in the embodiment as illustrated in FIG.

6A, a first tubing port 606 and a second tubing port 608 are disposed on (and may protrude from) the first surface 604.

The first tubing port 606 and a second tubing port 608 may include rigid material, such as, for example, ceramic, metal, and/or other suitable material(s). In some embodiments, each of the first tubing port 606 and a second tubing port 608 may be in a shape similar to a ring shape. For example, each of the first tubing port 606 and a second tubing port 608 may have a radius of 3.90 mm, and a thickness of 0.15 mm. In some embodiments, the first tubing port 606 and the second tubing port 608 may be of different sizes.

It is contemplated that, in various embodiments, the shape of the first tubing port 606 and the shape of the second tubing port 608 are not limited to the shapes as illustrated in FIGS. 6A-6B, and the first tubing port 606 and/or the second tubing port 608 may be in form of other hollow shapes, including, for example, a hollow cuboid shape, a hollow prism shape, without deviating from the scope of the present disclosure.

In some embodiments, the first tubing port 606 and the second tubing port 608 may be positioned based on a predetermined distance. For example, a distance between the center of the first tubing port 606 and the center of the second tubing port 608 (i.e. a centerline to centerline distance) may be pre-determined so that sensors within the tubing ports (as described in detail below) can be precisely positioned. In some examples, this may provide the benefit of reducing mechanical tolerance stack up.

Further, as shown in FIG. 6A, the pressure sensor 600 may also include a first torus piece 610 and a second torus piece 612 surrounding the first tubing port 606 and the second tubing port 608, respectively. Each of the first torus piece 610 and the second torus piece 612 may be in the shape similar to a torus shape, and may include flexible material, such as, for example, rubber, silicone, and/or other suitable material(s).

Referring now to FIG. 6B, an example top view of the pressure sensor 600, highlighting various elements disposed on the first surface 604 of the substrate 602, is illustrated.

In various embodiments, one or more sensing elements may be disposed within an area of the first surface 604 of substrate 602 that is defined by a tubing port. For example, in the embodiment as shown in FIG. 6B, a first pressure sensing element 614 is disposed within the first tubing port 606, and a second pressure sensing element 616 is disposed within the second tubing port 608.

Similar to the first pressure sensing element 127 and the second pressure sensing element 129 described above in connection with FIGS. 1A-1B, the first pressure sensing element 614 and the second pressure sensing element 616 may be MEMS pressure sensing dies. In some embodiments, the first pressure sensing element 614 and the second pressure sensing element 616 may be disposed on the first surface 604 of the substrate 602 through, for example, bonding mechanism(s) (such as soldering through a lead-free solder) and/or adhesive material(s) (such as epoxy, polyurethane).

Further, in various embodiments, sensor conditioning circuitry (such as a signal conditioning ASIC) may be disposed within a tubing port. For example, in the embodiment as shown in FIG. 6B, sensor conditioning circuitry 618 is disposed on the first surface 604 of the substrate 602 and within the first tubing port 606. Similar to the sensor conditioning circuitry 131 described above in connection with FIGS. 1A-1B, the sensor conditioning circuitry 618 may be electronically coupled to the first pressure sensing element 614 and the second pressure sensing element 616.

The sensor conditioning circuitry 618 may receive the output signals from the first pressure sensing element 614 and the second pressure sensing element 616, which may indicate the presence and/or measurement(s) of pressure(s) in the corresponding location or environment. The sensor conditioning circuitry 618 may further output one or more output signals after function(s) are performed on the signals received from the first pressure sensing element 614 and the second pressure sensing element 616.

Figure 7:
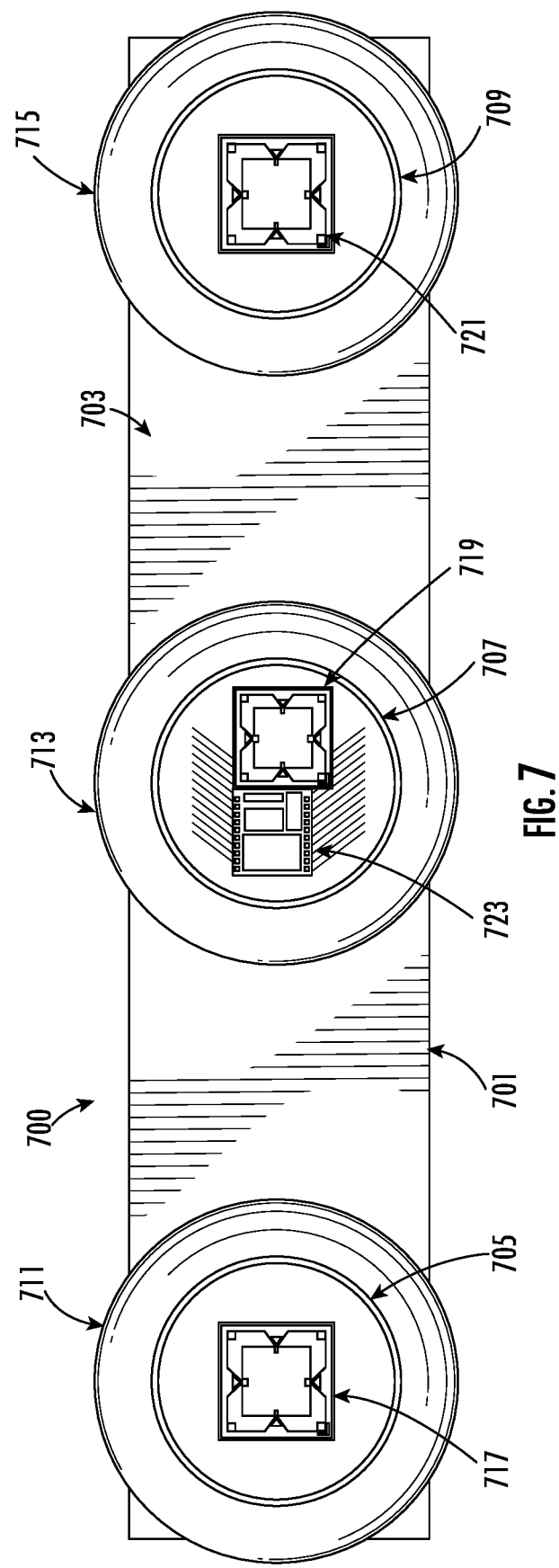
FIG. 7 illustrates a top view of an example pressure sensor in accordance with various embodiments of the present disclosure.

Referring now to FIG. 7, an example top view of an example pressure sensor 700 is illustrated.

As shown in FIG. 7, the pressure sensor 700 may include a substrate 701. Similar to the substrate 103 described above in connection with FIGS. 1A-1B, the substrate 701 may include material(s) such as, for example, silicon, ceramic, fiberglass, plastic and/or other suitable material(s).

The substrate 701 may comprise a first surface 703, and one or more tubing ports may be disposed on the first surface 703. For example, in the embodiment as illustrated in FIG. 7, a first tubing port 705, a second tubing port 707, and a third tubing port 709 are disposed on (and may protrude from) the first surface 703.

Similar to the first tubing port 606 and a second tubing port 608 described above in connection with FIGS. 6A-6B, each of the first tubing port 705, the second tubing port 707, and the third tubing port 709 may, for example, include rigid material and in a shape similar to a ring shape. In some embodiments of the present disclosure, the first tubing port 705, the second tubing port 707, and the third tubing port 709 may include other material(s) and/or in other shape(s).

Further, as shown in FIG. 7, the pressure sensor 700 may also include a first torus piece 711, a second torus piece 713, and a third torus piece 715 surrounding the first tubing port 705, the second tubing port 707, and the third tubing port 709, respectively. Similar to the first torus piece 610 and a second torus piece 612 described above in connection with FIGS. 6A and 6B, each of the first torus piece 711, the second torus piece 713, and the third torus piece 715 may, for example, include flexible material and in a shape similar to a torus shape. In some embodiments of the present disclosure, the first torus piece 711, the second torus piece 713, and the third torus piece 715 may include other material(s) and/or in other shape(s).

In various embodiments, one or more sensing elements may be disposed within an area of the first surface 703 of substrate 701 that is defined by a tubing port. For example, in the embodiment as shown in FIG. 7, a first pressure sensing element 717 is disposed within the first tubing port 705, a second pressure sensing element 719 is disposed within the second tubing port 707, and a third pressure sensing element 721 is disposed within the third tubing port 709.

Similar to the first pressure sensing element 127 and the second pressure sensing element 129 described above in connection with FIGS. 1A-1B, the first pressure sensing element 717, the second pressure sensing element 719, and the third pressure sensing element 721 may be MEMS pressure sensing dies. In some embodiments, the first pressure sensing element 717, the second pressure sensing element 719, and the third pressure sensing element 721 may be disposed on the first surface 703 of the substrate 701 through, for example, bonding mechanism(s) (such as soldering through a lead-free solder) and/or adhesive material(s) (such as epoxy, polyurethane).

Further, in various embodiments, sensor conditioning circuitry (such as a signal conditioning ASIC) may be disposed within a tubing port. For example, in the embodiment as shown in FIG. 7, sensor conditioning circuitry 723 is disposed on the first surface 703 of the substrate 701 and within the second tubing port 707. Similar to the sensor conditioning circuitry 131 described above in connection with FIGS. 1A-1B, the sensor conditioning circuitry 723 may be electronically coupled to the first pressure sensing element 717, the second pressure sensing element 719, and the third pressure sensing element 721. The sensor conditioning circuitry 723 may receive the output signals from the first pressure sensing element 717, the second pressure sensing element 719, and the third pressure sensing element 721, which may indicate the presence and/or measurement(s) of pressures in the corresponding location or environment. The sensor conditioning circuitry 723 may further output one or more output signals after function(s) are performed on the signals received from the first pressure sensing element 717, the second pressure sensing element 719, and the third pressure sensing element 721.

It is contemplated that, in various embodiments of the present disclosure, two, three, or more (N number) pressure sensing elements (such as pressure sensing dies) may be disposed on the first surface of the substrate. In such embodiments, one sensor conditioning circuitry (such as a signal conditioning ASIC) may be scaled based on the N number of the pressure sensing elements to receive N number of outputs from the pressure sensing elements, perform corresponding function(s), and output one or more signals.

Referring now to FIG. 8, an example top view of an example pressure sensor 800 is illustrated.

As shown in FIG. 8, the pressure sensor 800 may include a substrate 802. Similar to the substrate 103 described above in connection with FIGS. 1A-1B, the substrate 802 may include material(s) such as, for example, silicon, ceramic, fiberglass, plastic and/or other suitable material(s).

The substrate 802 may comprise a first surface 804, and one or more tubing ports may be disposed on the first surface 804. For example, in the embodiment as illustrated in FIG. 8, a first tubing port 806 and a second tubing port 808 are disposed on (and may protrude from) the first surface 804.

Similar to the first tubing port 606 and a second tubing port 608 described above in connection with FIGS. 6A-6B, each of the first tubing port 806 and the second tubing port 808 may, for example, include rigid material and in a shape similar to a ring shape. In some embodiments of the present disclosure, the first tubing port 806 and the second tubing port 808 may include other material(s) and/or in other shape(s).

Further, as shown in FIG. 8, the pressure sensor 800 may also include a first torus piece 810 and a second torus piece 812 surrounding the first tubing port 806 and the second tubing port 808, respectively. Similar to the first torus piece 610 and a second torus piece 612 described above in connection with FIGS. 6A and 6B, each of the first torus piece 810 and the second torus piece 812 may, for example, include flexible material and in a shape similar to a torus shape. In some embodiments of the present disclosure, the first torus piece 810 and the second torus piece 812 may include other material(s) and/or in other shape(s).

In various embodiments, sensor conditioning circuitry and one or more sensing elements may be disposed on the first surface 804 of the substrate 802. In some embodiments, the one or more sensing elements may be in a "stacked die configuration."

For example, referring to FIG. 8, a first pressure sensing element 814 may be placed on top of sensor conditioning circuitry 818, and a second pressure sensing element 816 may be placed on top of a buffer layer 820. The sensor conditioning circuitry 818 may be, for example, a signal conditioning ASIC layer that is electronically coupled to the first pressure sensing element 814 and the second pressure sensing element 816. The buffer layer 820 may include material such as, for example, silicon and/or glass. The first pressure sensing element 814 and the second pressure sensing element 816 may be similar to the first pressure sensing element 127 and the second pressure sensing element 129 described above in connection with FIGS. 1A-1B.

Additionally or alternatively, one or more sensing elements may be placed on top of one or more layers of electronic communication elements. Example electronic communication elements may be an integrated circuit (IC) according to wired or wireless communication protocols, including, for example, a Bluetooth® Low Energy (BLE) IC and/or a BLE system on chip (SOC) IC.

For example, referring to FIG. 8, the second pressure sensing element 816 may be placed on top of a layer of electronic communication element (instead of a buffer layer) such as a BLE IC or BLE SOC IC that is disposed on the first surface 804 of the substrate 802. The first pressure sensing element 814 may be placed on top of a signal conditioning ASIC layer, and the signal conditioning ASIC layer is electronically coupled to both the first pressure sensing element 814 and the second pressure sensing element 816.

Referring now to FIG. 9, an example top view of an example pressure sensor 900 is illustrated.

As shown in FIG. 9, the pressure sensor 900 may include a substrate 901. Similar to the substrate 103 described above in connection with FIGS. 1A-1B, the substrate 901 may include material(s) such as, for example, silicon, ceramic, fiberglass, plastic and/or other suitable material(s).

The substrate 901 may comprise a first surface 903, and one or more tubing ports may be disposed on the first surface 903. For example, in the embodiment as illustrated in FIG. 9, a first tubing port 905 and a second tubing port 907 are disposed on (and may protrude from) the first surface 804.

Similar to the first tubing port 606 and a second tubing port 608 described above in connection with FIGS. 6A-6B, each of the first tubing port 905 and the second tubing port 907 may, for example, include rigid material and in a shape similar to a ring shape. In some embodiments of the present disclosure, the first tubing port 905 and the second tubing port 907 may include other material(s) and/or in other shape(s).

As shown in FIG. 9, the pressure sensor 900 may also include a first torus piece 909 and a second torus piece 911 surrounding the first tubing port 905 and the second tubing port 907, respectively. Similar to the first torus piece 610 and a second torus piece 612 described above in connection with FIGS. 6A and 6B, each of the first torus piece 909 and the second torus piece 911 may, for example, include flexible material and in a shape similar to a torus shape. In some embodiments of the present disclosure, the first torus piece 909 and the second torus piece 911 may include other material(s) and/or in other shape(s).

Further, the pressure sensor 900 may include a first pressure sensing element 913 and a second pressure sensing element 915. Similar to the first pressure sensing element 814 and the second pressure sensing element 816 described above in connection with FIG. 8, a first pressure sensing element 913 and a second pressure sensing element 915 may be placed on top of one or more layers. For example, the first pressure sensing element 913 may be placed on top of a signal conditioning ASIC layer 917, and the second pressure sensing element 915 may be placed on top of a buffer layer 919.

Further, in the embodiment as illustrated in FIG. 9, the one or more layers may include one or more trenches. For example, the signal conditioning ASIC layer 917 may include an integrated stress isolation trench 921, and/or the buffer layer 919 may include an integrated stress isolation trench 923. The integrated stress isolation trench 921 and/or the integrated stress isolation trench 923 may reduce electric current leakage to and/or from corresponding pressure sensing element. In some embodiments, the integrated stress isolation trench 921 and/or the integrated stress isolation trench 923 may include material such as, for example, silicon.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A pressure sensor, comprising:
a substrate having a first surface;
a first tubing port disposed on the first surface, wherein a first pressure sensing element is disposed within the first tubing port; and
a second tubing port disposed on the first surface, wherein a second pressure sensing element is disposed within the second tubing port.

2. The pressure sensor of claim 1, further comprising:
a sensor conditioning circuitry electronically coupled to the first pressure sensing element and the second pressure sensing element.

3. The pressure sensor of claim 2, wherein the sensor conditioning circuitry is disposed within the first tubing port.

4. The pressure sensor of claim 2, wherein the sensor conditioning circuitry multiplexes signals from the first pressure sensing element and the second pressure sensing element.

5. The pressure sensor of claim 2, wherein the sensor conditioning circuitry amplifies signals from the first pressure sensing element and the second pressure sensing element.

6. The pressure sensor of claim 2, wherein the sensor conditioning circuitry converts analog signals from the first pressure sensing element and the second pressure sensing element to digital signals.

7. The pressure sensor of claim 2, wherein the sensor conditioning circuitry is a signal conditioning application-specific integrated circuit (ASIC).

8. The pressure sensor of claim 1, further comprising:
a first torus piece surrounding the first tubing port; and
a second torus piece surrounding the second tubing port.

9. The pressure sensor of claim 8, wherein the first torus piece and the second torus piece comprise at least one of rubber material or silicon material.

10. The pressure sensor of claim 1, wherein the first pressure sensing element is a first micro-electro-mechanical system (MEMS) pressure sensing die, wherein the second pressure sensing element is a second MEMS pressure sensing die.

11. The pressure sensor of claim 1, wherein the first pressure sensing element and the second pressure sensing element are disposed on the first surface of the substrate.

12. The pressure sensor of claim 1, further comprising:
a third tubing port disposed on the first surface, wherein a third pressure sensing element is disposed within the third tubing port.

13. The pressure sensor of claim 12, further comprising:
a sensor conditioning circuitry electronically coupled to the first pressure sensing element, the second pressure sensing element, and the third pressure sensing element.

14. The pressure sensor of claim 13, wherein the sensor conditioning circuitry is disposed within the second tubing port.

15. The pressure sensor of claim 13, wherein the sensor conditioning circuitry multiplexes signals from the first pressure sensing element, the second pressure sensing element, and the third pressure sensing element.

16. The pressure sensor of claim 13, wherein the sensor conditioning circuitry amplifies signals from the first pressure sensing element, the second pressure sensing element and the third pressure sensing element.

17. The pressure sensor of claim 13, wherein the sensor conditioning circuitry converts analog signals from the first pressure sensing element, the second pressure sensing element, and the third pressure sensing element to digital signals.

18. The pressure sensor of claim 13, wherein the sensor conditioning circuitry is a signal conditioning application-specific integrated circuit (ASIC).

19. The pressure sensor of claim 12, wherein the first pressure sensing element is a first micro-electro-mechanical system (MEMS) pressure sensing die, wherein the second pressure sensing element is a second MEMS pressure sensing die, wherein the third pressure sensing element is a third MEMS pressure sensing die.

20. The pressure sensor of claim 12, wherein the first pressure sensing element, the second pressure sensing element, and the third pressure sensing element are disposed on the first surface of the substrate.

* * * * *